(12) United States Patent
Ollikainen et al.

(10) Patent No.: US 9,369,008 B2
(45) Date of Patent: Jun. 14, 2016

(54) METHOD, APPARATUS, AND COMPUTER PROGRAM PRODUCT FOR POWERING ELECTRONIC DEVICES

(71) Applicant: Nokia Corporation, Espoo (FI)

(72) Inventors: Jani Ollikainen, Helsinki (FI); Joni Jantunen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 335 days.

(21) Appl. No.: 13/847,627

(22) Filed: Mar. 20, 2013

(65) Prior Publication Data

US 2014/0287681 A1    Sep. 25, 2014

(51) Int. Cl.
*H04B 7/00* (2006.01)
*H02J 17/00* (2006.01)
*H04B 5/00* (2006.01)

(52) U.S. Cl.
CPC .............. *H02J 17/00* (2013.01); *H04B 5/0031* (2013.01); *H04B 5/0062* (2013.01); *H04B 5/0075* (2013.01)

(58) Field of Classification Search
CPC .......... H04B 5/0031; H04B 5/00; H04B 7/00; H04B 5/0062; H04B 5/0075; H02J 17/00
USPC ...................... 455/41.1, 41.2, 41.3
See application file for complete search history.

(56) References Cited

U.S. PATENT DOCUMENTS

| | | | |
|---|---|---|---|
| 5,196,682 A | 3/1993 | Englehardt | |
| 5,528,409 A | 6/1996 | Cucci et al. | |
| 6,840,455 B2 | 1/2005 | Norton | |
| 7,032,822 B2 | 4/2006 | Waters | |
| 7,305,260 B2 | 12/2007 | Vuori et al. | |
| 7,421,269 B2 | 9/2008 | Kostiainen et al. | |
| 7,514,899 B2 | 4/2009 | Deng-Peng | |
| 7,962,186 B2 | 6/2011 | Cui et al. | |
| 8,301,024 B2 | 10/2012 | Mather et al. | |
| 8,846,255 B2 | 9/2014 | Dineen | |
| 2010/0078995 A1* | 4/2010 | Hyde et al. ....................... 307/11 |
| 2010/0079005 A1* | 4/2010 | Hyde ...................... H02J 17/00 307/104 |
| 2010/0190436 A1 | 7/2010 | Cook et al. | |
| 2010/0328043 A1 | 12/2010 | Jantunen et al. | |
| 2011/0279882 A1 | 11/2011 | Chan et al. | |
| 2012/0075796 A1 | 3/2012 | Attlesey | |
| 2012/0329405 A1* | 12/2012 | Lee et al. .......................... 455/73 |
| 2013/0181539 A1* | 7/2013 | Muratov et al. ............... 307/104 |
| 2013/0215042 A1* | 8/2013 | Messerschmidt et al. .... 345/173 |

(Continued)

OTHER PUBLICATIONS

"ST Extends Family of RFID/NFC Wireless Memory ICs", SmartSense, Nov. 20, 2011 21:58:53, http://thesmartsense.com/print138666, copied from website on Mar. 29, 2013.

(Continued)

*Primary Examiner* — Yuwen Pan
*Assistant Examiner* — Xin Jia
(74) *Attorney, Agent, or Firm* — Locke Lord LLP

(57) ABSTRACT

Example method, apparatus, and computer program product embodiments are disclosed for negotiation of wireless powering of passive objects. Example embodiments of the invention include a method comprising: receiving, via a radio frequency wireless interface of an apparatus, a radio frequency signal from a wireless device, indicating that the wireless device is capable of receiving optical powering; switching on, by the apparatus, an optical energy source in the apparatus; and transmitting, by the apparatus, from the optical energy source, optical power to the wireless device in response to the radio frequency signal.

14 Claims, 11 Drawing Sheets

(56) References Cited

U.S. PATENT DOCUMENTS

2014/0016945 A1\* 1/2014 Pan .............................. 398/171
2014/0070774 A1  3/2014 Terlizzi et al.
2014/0222855 A1  8/2014 Lucero et al.

OTHER PUBLICATIONS

"JEDEC Announces Plans to Standardize Non-Volatile Wireless Memory", Arlington, Va., USA—April 12, 2012, http://www.jedec.org/news/pressreleases/jedec-announces-plans-standardize-non-volatile-wireless-memory, copied from website on Mar. 29, 2013.

Iiro Jantunen, Joni Jantunen, Jaakko Varteva, and Jarmo Arponen, "Wireless Memory Tags", Nokia Research Center, Helsinki, Finland, http://elec.aalto.fi/fi/current/news/ict2008_minami_wirelessmemorytags_nokia.pdf; copied from website on Mar. 29, 2013.

Iiro Jantunen, Joni Jantunena, Harald Kaajaa, Sergey Boldyrev, Le Wang, Jyri Hämäläinen, "System Architecture for High-speed Close-proximity Low-power RF Memory Tags and Wireless Internet Access", International Journal on Advances in Telecommunications, vol. 4 No. 3 & 4, year 2011, pp. 217-228.

\* cited by examiner

STEP 362: TRANSMITTING, BY AN APPARATUS, A RADIO FREQUENCY SIGNAL TO A MOBILE WIRELESS DEVICE, INDICATING THAT THE APPARATUS IS CAPABLE OF RECEIVING OPTICAL POWERING;

→

STEP 364: RECEIVING, BY THE APPARATUS, OPTICAL POWER FROM THE MOBILE WIRELESS DEVICE IN RESPONSE TO THE RADIO FREQUENCY SIGNAL; AND

→

STEP 366: OPERATING, BY THE APPARATUS, ELECTRONIC COMPONENTS IN THE APPARATUS, USING AT LEAST THE OPTICAL POWER FROM THE MOBILE WIRELESS DEVICE.

METHOD, APPARATUS, AND COMPUTER PROGRAM PRODUCT FOR POWERING ELECTRONIC DEVICES

FIELD

The field of the invention relates to wireless communication, and more particularly to negotiation of wireless powering.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHz/1.8 GHz bands in Europe and at 850 MHz and 1.9 GHz in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other short-range communication technologies include Bluetooth™ Low Energy, IEEE 802.11 wireless local area network (WLAN), Wireless USB, ZigBee (IEEE 802.15.4, IEEE 802.15.4a), and ultra high frequency radio frequency identification (UHF RFID) technologies. All of these wireless communication technologies have features and advantages that make them appropriate for various applications.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch may establish an NFC connection that may be used to exchange specific information for another communications protocol, which may then be used to create an actual connection in the other communications protocol, such as Bluetooth™ or wireless local area network (WLAN).

SUMMARY

Example method, apparatus, and computer program product embodiments are disclosed for negotiation of wireless powering of passive objects.

Example embodiments of the invention include a method comprising:

receiving, via a radio frequency wireless interface of an apparatus, a radio frequency signal from a wireless device, indicating that the wireless device is capable of receiving optical powering;

switching on, by the apparatus, an optical energy source in the apparatus; and transmitting, by the apparatus, from the optical energy source, optical power to the wireless device in response to the radio frequency signal.

Example embodiments of the invention include a method comprising:

receiving, by the apparatus, a radio frequency wireless message from the wireless device, indicating optical power requirements of the wireless device; and transmitting, by the apparatus, optical power at a level based on the indicated optical power requirements.

Example embodiments of the invention include a method comprising:

exchanging, via the radio frequency wireless interface of the apparatus, radio frequency wireless messages including data to be communicated with the wireless device.

Example embodiments of the invention include a method comprising:

transmitting a radio frequency signal providing initial power for the wireless device, the signal comprising near field communication signal; and transmitting, by the apparatus, optical power to the wireless device, to supplement the energy provided by the radio frequency signal.

Example embodiments of the invention include a method comprising:

receiving, by the apparatus, a radio frequency wireless message from the wireless device, indicating no more optical power is required by the wireless device; and switching off, by the apparatus, the optical energy source in the apparatus;

Example embodiments of the invention include a method comprising:

wherein the apparatus is a mobile device that includes a camera and the optical energy source in the apparatus comprises an optical flash associated with the camera.

Example embodiments of the invention include a method comprising:

transmitting, by an apparatus, a radio frequency signal to a mobile wireless device, indicating that the apparatus is capable of receiving optical powering;

receiving, by the apparatus, optical power from the mobile wireless device in response to the radio frequency signal; and operating, by the apparatus, electronic components in the apparatus, using at least the optical power from the mobile wireless device.

Example embodiments of the invention include a method comprising:

using, by the apparatus, an excess portion of the received optical power for reading data from or storing data into an associated memory of the apparatus.

Example embodiments of the invention include a method comprising:

exchanging, by the apparatus, radio frequency wireless messages including data via a radio frequency wireless interface of the mobile wireless device.

Example embodiments of the invention include a method comprising:

transmitting, by the apparatus, a radio frequency wireless message to the mobile wireless device, indicating optical power requirements of the apparatus; and receiving, by the apparatus, optical power from the mobile wireless device, at a level based on the indicated optical power requirements.

Example embodiments of the invention include an apparatus comprising:

an optical energy source;
a radio frequency wireless interface;
at least one processor;
at least one memory including computer program code;
the at least one memory and the computer program code configured to, with the at least one processor, cause the apparatus at least to:

receive, via the radio frequency wireless interface, a radio frequency signal from a wireless device, indicating that the wireless device is capable of receiving optical powering;

switch on the optical energy source in the apparatus; and transmit, from the optical energy source, optical power to the wireless device in response to the radio frequency signal.

Example embodiments of the invention include an apparatus comprising:

the at least one memory and the computer program code configured to, with the at least one processor, cause the apparatus at least to:

receive a radio frequency wireless message from the wireless device, indicating optical power requirements of the wireless device; and transmit optical power at a level based on the indicated optical power requirements.

Example embodiments of the invention include an apparatus comprising:

the at least one memory and the computer program code configured to, with the at least one processor, cause the apparatus at least to:

exchange, via the radio frequency wireless interface, radio frequency wireless messages including data to be communicated with the wireless device.

Example embodiments of the invention include an apparatus comprising:

the at least one memory and the computer program code configured to, with the at least one processor, cause the apparatus at least to:

transmit a radio frequency signal providing initial power for the wireless device, the signal comprising near field communication signal; and transmit optical power to the wireless device, to supplement the energy provided by the radio frequency signal.

Example embodiments of the invention include an apparatus comprising:

the at least one memory and the computer program code configured to, with the at least one processor, cause the apparatus at least to:

receive a radio frequency wireless message from the wireless device, indicating no more optical power is required by the wireless device; and switch the optical energy source in the apparatus;

Example embodiments of the invention include an apparatus comprising:

wherein the apparatus is a mobile device that includes a camera and the optical energy source in the apparatus comprises an optical flash associated with the camera.

Example embodiments of the invention include an apparatus comprising:

at least one processor;
at least one memory including computer program code;
the at least one memory and the computer program code configured to, with the at least one processor, cause the apparatus at least to:

transmit a radio frequency signal to a mobile wireless device, indicating that the apparatus is capable of receiving optical powering;

receive optical power from the mobile wireless device in response to the radio frequency signal; and operate electronic components in the apparatus, using at least the optical power from the mobile wireless device.

Example embodiments of the invention include an apparatus comprising:

the at least one memory and the computer program code configured to, with the at least one processor, cause the apparatus at least to:

use an excess portion of the received optical power for reading data from or storing data into an associated memory of the apparatus.

Example embodiments of the invention include an apparatus comprising:

the at least one memory and the computer program code configured to, with the at least one processor, cause the apparatus at least to:

exchange radio frequency wireless messages including data via a radio frequency wireless interface of the mobile wireless device.

Example embodiments of the invention include an apparatus comprising:

the at least one memory and the computer program code configured to, with the at least one processor, cause the apparatus at least to:

transmitting, by the apparatus, a radio frequency wireless message to the mobile wireless device, indicating optical power requirements of the apparatus; and receiving, by the apparatus, optical power from the mobile wireless device, at a level based on the indicated optical power requirements.

Example embodiments of the invention include a computer program product comprising computer executable program code recorded on a computer readable non-transitory storage medium, the computer executable program code comprising:

code for receiving, via a radio frequency wireless interface of an apparatus, a radio frequency signal from a wireless device, indicating that the wireless device is capable of receiving optical powering;

code for switching on, by the apparatus, an optical energy source in the apparatus; and code for transmitting, by the apparatus, from the optical energy source, optical power to the wireless device in response to the radio frequency signal.

Example embodiments of the invention include a computer program product comprising computer executable program code recorded on a computer readable non-transitory storage medium, the computer executable program code comprising:

code for transmitting, by an apparatus, a radio frequency signal to a mobile wireless device, indicating that the apparatus is capable of receiving optical powering;

code for receiving, by the apparatus, optical power from the mobile wireless device in response to the radio frequency signal; and code for operating, by the apparatus, electronic components in the apparatus, using at least the optical power from the mobile wireless device.

The resulting embodiments enable negotiation of wireless powering of passive objects.

DESCRIPTION OF THE FIGURES

FIG. 3B is an example flow diagram of the process performed by the second wireless device B', in accordance with example embodiments of the invention.

DISCUSSION OF EXAMPLE EMBODIMENTS OF THE INVENTION

Figure 1A:
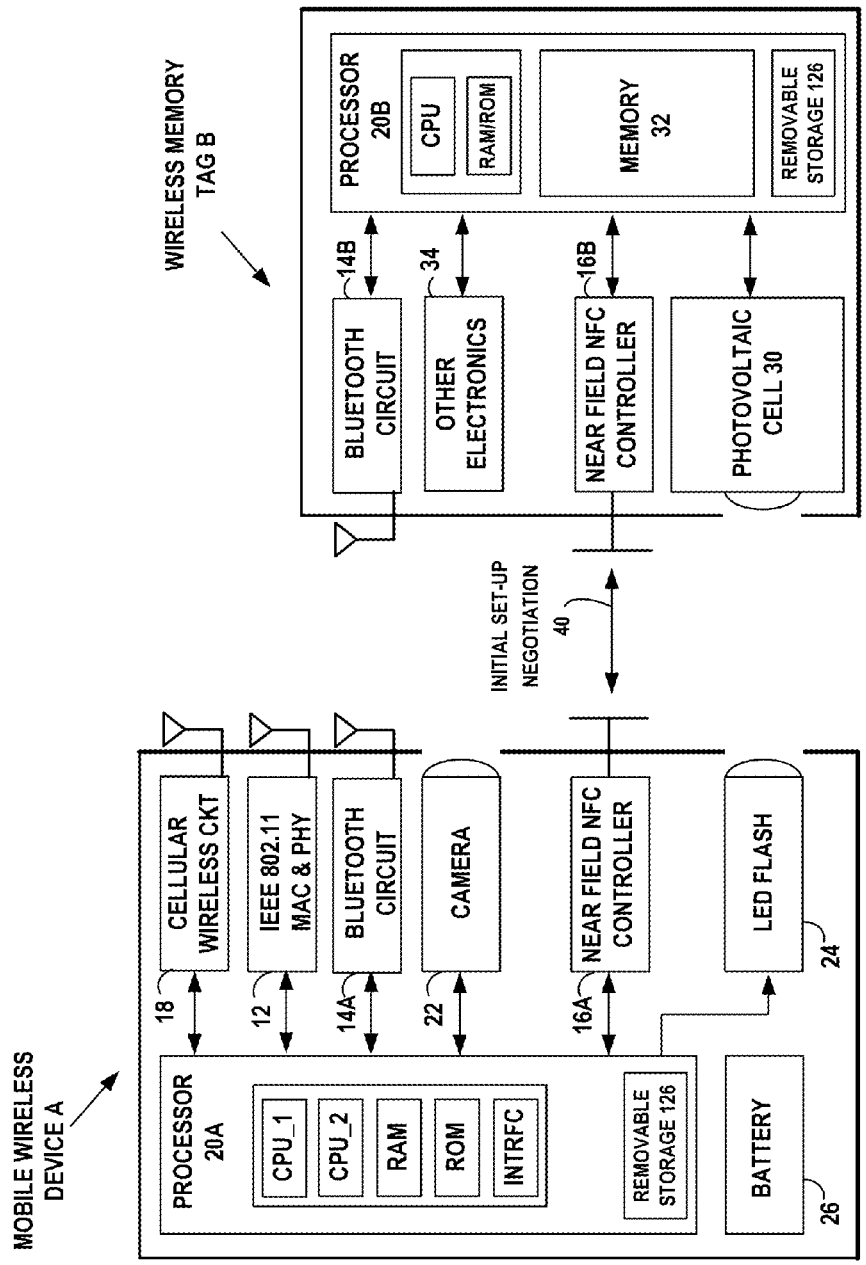
FIG. 1A is an example network diagram of a mobile wireless device A and a wireless memory tag B, performing an initial setup negotiation using a Near Field Communications (NFC) connection. The negotiation may establish supplementary optical power delivery from the mobile wireless device A to the wireless memory tag B, in accordance with example embodiments of the invention.

This section is organized into the following topics:
A. Wireless Short-Range Communication Networks
B. Bluetooth™ Communication Technology
C. Near-Field Communication (NFC) Technology
D. Wireless Memory Tag Technology
E. Digital Camera Technology
F. Use of Mobile Device Camera Flash for Powering Electronic Devices A. Wireless Short-Range Communication Networks Short-range communication technologies provide communication solutions appropriate for many data applications, without the cost, traffic and legislative concerns of longer-range communication technologies. Short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), ZigBee (IEEE 802.15.4, IEEE 802.15.4a), and near field communication technologies, such as radio frequency identification (RFID) and near field communication (NFC) technology that enable contactless identification and interconnection of wireless devices.

B. Bluetooth™ Communication Technology

A procedure for forming connections between Bluetooth™ devices is described in the *Bluetooth™ Specification*, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation may include inquiry, inquiry scanning, inquiry response, in addition to paging, page scanning, and page response procedures.

C. Near-Field Communication (NFC) Technology

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product.

RFID transponders may be the passive type or the active type. A passive RFID transponder requires no internal power source to communicate with an RFID reader, and is only active when it is near an RFID reader that energizes the transponder with a continuous radio frequency signal at a resonant frequency of the antenna. The small electrical current induced in the antenna by the continuous radio frequency signal provides enough power for an integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader. The RFID transponder may be affixed to or integrated with a mobile wireless device and the user may bring the RFID transponder on one device close to an RFID reader circuit in another mobile wireless device to allow near field communication between the devices. In example embodiments, both devices may have RFID reader circuits to read RFID signals from the other device.

In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch may establish an NFC connection.

Near-field communication (NFC) technology communicates between two NFC Devices or between an NFC device and an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The NFC radio may be affixed to a new wireless client device (STA) and the user brings the NFC radio on the device close to an access point (AP) or Registrar of the Network to allow near field communication between the devices.

NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The ISO/IEC 18092 standard defines communication modes for Near Field Communication Interface and Protocol (NFCIP-1) using inductively coupled devices operating at the center frequency of 13.56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

The NFC Data Exchange Format (NDEF) specification, NFC Forum Data Exchange Format (NDEF) Specification, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in NFC Forum Logical Link Control Protocol Specification, NFC Forum™, 2009 (incorporated herein by reference). The NFC Connection Handover specification, NFC Forum Connection Handover Specification, NFC Forum™, 2010 Jul. 7 (incorporated herein by reference), defines the exchange of NDEF messages between two NFC Devices in a negotiated handover to discover and negotiate alternative wireless communication technologies.

D. Wireless Memory Tag Technology

NFC devices may also be used for low power level wireless powering. As an example, a mobile wireless device may provide power wirelessly to a wireless memory tag. With wireless powering, a large memory and an ultra-low power wireless broadband transceiver embedded in the tag may be powered for wireless reading and writing of the memory in the tag. A special wireless powering mode may be used to keep high power transfer efficiency on during the whole data transfer session of the wireless memory operation. Power transfer of 20-50 mW power class may be done using standard NFC transceivers and typical NFC antennas up to 30 mm distances.

A wireless memory tag may be an integrated package that comprises a digital memory and an NFC controller capable of exchanging NFC radio frequency (RF) signals with other NFC controllers or with NFC tags. A wireless memory tag typically has no battery power of its own, but extracts its operating power from an NFC signal received from another NFC controller. The memory of a wireless memory tag may be a non-volatile memory such as an electrically erasable, programmable, read-only memory (EEPROM) module that may be combined with a volatile random access memory (RAM) module. The memory is coupled to the NFC controller that includes operating logic and transport layer firmware. An NFC discovery RF signal sequence may be exchanged between two NFC controllers, each sequence of RF signals comprising a plurality of discovery periods. Discovery periods may include a poll interval, a listen interval, and an idle interval. For example, an NFC Reader/Writer device such as a tag reader that is part of a mobile telephone, has sufficient power to transmit poll messages in polling intervals. A general purpose NFC device such as a mobile telephone, may have some or all of those intervals, depending on the device's mode of operation. An NFC Reader/Writer device in a wireless memory tag that has no battery power available, must rely on receiving poll messages from other devices and then extracting its operating power from the received poll message to respond with its own poll message.

Wireless memory tags may include radio-frequency identification tags that are accessed with very high data rates. These wireless memory tags may be powered by a continuous wave radio signal at one set powering radio frequency (for example 13.56 MHz or 900 MHz) while data transfer is carried out using simple on-off keying on a set of ultra-wideband communication radio frequencies. The wireless memory tags may be designed to operate over short distances in order to enable very high data rates.

A wireless device may include both a narrow-band transmitter to provide both power and clock signals to a wireless memory tag. The wireless device may further include an ultra-wide band transceiver to transmit and receive ultra-wide band signals with the wireless memory tag, at a very high data rate within reference time frames established by the narrow-band clock signals. Correspondingly, the wireless memory tag may include a wireless module to extract the narrow-band clock signal and wireless power signal to establish the reference time frames and to receive the operating power from the wireless device. The wireless memory module may further include an ultra-wide band transceiver to transmit and receive the ultra-wide band signals with the wireless device, at the very high data rate within the reference time frames established by the narrow-band clock signals.

The narrow-band signal may have an example frequency in the range of 860 MHz to 960 MHz or 13.65 MHz. The bandwidth of the narrow band signal depends on embodiment and may be for example, 50 kHz to 1 MHz. The narrow-band synchronization signal provides a timing reference for wireless memory tags that are within range. The ultra-wide band transceiver may have an example frequency of 7.9 GHz. Another frequency band is the 60 GHz ISM band. The wireless memory tag may reside anywhere within a range corresponding to a radio propagation distance on the order of half a meter.

E. Digital Camera Technology

Many wireless mobile devices, such as cell phones, include a digital camera. Digital cameras include a single lens or a lens system for forming an image on a sensor, such as a solid-state sensor. Under the control of a processor, an image is captured when the user takes a picture and the captured image may be stored in a memory. The camera may have a user-interface to allow the user to choose the settings of the camera. The camera may also have a flash unit with an emissive light source, such as a light emitting diode (LED), powered by the camera's battery, to illuminate the object being photographed. The flash unit may be operatively connected to the processor so that the light source of the flash unit may be controlled or addressed by the processor. The camera may have an ambient light sensing unit for determining the level of ambient light. A lookup table associated with the processor, may store calibration weights for the amount of power to be applied to the flash unit LED to compensate for various levels of ambient light sensed by the light sensing unit. If the sensor signal is below a pre-defined value, the flash unit is identified as the main source of illumination, and the calibration weights is selected from the lookup table to produce a correct amount of illumination to enable capturing a good image of the object being photographed.

F. Use of Mobile Device Camera Flash for Powering Electronic Devices

In accordance with an example embodiment of the invention, the camera flash of a mobile wireless device may be used to provide additional power to a wireless memory tag. In an example embodiment of the invention, a mobile wireless device may be used to read a wireless memory tag in the same way as it would be used to read an NFC tag. An NFC controller in the mobile wireless device may be used to transmit signal energy that may be collected by an NFC controller in the wireless memory tag and used to power the wireless memory tag's electronics. The camera flash in the mobile wireless device may be located so that most of the light available from the camera flash will illuminate the surface of the wireless memory tag. The light transmitted by the camera flash may be collected in the tag by means of a photovoltaic cell or solar panel and used by the electronics of the tag. In this manner, the power available in the tag for data transfer and processing is significantly increased.

In accordance with an example embodiment of the invention, the NFC controller of the mobile wireless device may send an NFC interrogation signal to read the NFC controller of the wireless memory tag and receive a radio frequency NFC response signal from the tag. The response signal may indicate that the wireless memory tag may be capable of receiving optical powering. An initial setup negotiation may be conducted between the mobile wireless device and the wireless memory tag, via an NFC connection established between the devices. The mobile wireless device may receive a radio frequency wireless message from the wireless memory tag, indicating optical power requirements of the wireless memory tag. In response, the mobile wireless device may transmit optical power at a level based on the indicated optical power requirements.

Then, in accordance with an example embodiment of the invention, the mobile wireless device may switch on its camera flash and transmit the optical power to the wireless device in response to the indicated optical power requirements.

In accordance with an example embodiment of the invention, the wireless memory tag may receive the optical power from the mobile wireless device and use it to operate the electronic components in the tag, including accessing, reading from and writing into the memory module in the tag.

In accordance with an example embodiment of the invention, the mobile wireless device may receive an NFC message from the wireless memory tag, indicating a change in optical power requirements of the tag. In response, the mobile wireless device may adjust the optical power transmitted it transmits, based on the indicated change in optical power requirements.

In accordance with an example embodiment of the invention, the mobile wireless device may transmit optical power to the wireless memory tag to supplement energy provided to the wireless memory tag by the near field communications signal.

In accordance with an example embodiment of the invention, the mobile wireless device may receive an NFC message from the wireless memory tag, indicating no more optical power may be required by the tag and, in response, switch off the camera flash energy source in the mobile wireless device.

In accordance with an example embodiment of the invention, an alternative to a camera flash may be the light source of a pico projector. It may be used in two ways: 1) the projectors lens may be directly pointed towards the tag, or 2) there may be an alternative light guide that may be used to channel the projector's light to a convenient location for powering the tags.

In accordance with an example embodiment of the invention, an alternative to a camera flash may be any suitably located and bright enough light source for powering. In case a mobile device, tablet, etc may contain a separate torch, that may also be used.

FIG. 1A is an example network diagram of a mobile wireless device A and a wireless memory tag B, performing an initial setup negotiation 40 using a Near Field Communications (NFC) connection. The negotiation may be to establish supplementary optical power delivery from the mobile wireless device A to the wireless memory tag B, in accordance with example embodiments of the invention.

In accordance with an example embodiment of the invention, the mobile wireless device A may be a communications device, PDA, cell phone, laptop or palmtop computer, or the like. The mobile wireless device A includes a processor 20A, which includes a dual core or multi-core central processing unit (CPU_1 and CPU_2), a random access memory (RAM), a read only memory (ROM), and interface circuits to interface with one or more radio transceivers, battery and other power sources, key pad, touch screen, display, microphone, speakers, ear pieces, camera or other imaging devices, etc. in the mobile wireless device A. The RAM and ROM may be removable memory devices such as smart cards, SIMs, WIMs, semiconductor memories such as RAM, ROM, PROMS, flash memory devices, etc. The an NCI driver in mobile wireless device A communicates over an NFC controller interface (NCI) with NCI firmware in the NFC controller 16A via a transport layer driver in mobile wireless device A and a transport layer firmware in NFC controller 16A.

The mobile wireless device A may include a digital camera 22 and an LED flash 24 or other suitable flash source. The digital camera includes a single lens or a lens system for forming an image on a sensor, such as a solid-state sensor. Under the control of the processor 20A, an image may be captured when the user takes a picture and the captured image may be stored in the RAM memory. The camera 22 may have a user-interface to allow the user to choose the settings of the camera. The camera 22 may also have a flash unit 24 with an emissive light source, such as a light emitting diode (LED) or other suitable flash source, powered by the battery 26, to illuminate the object being photographed. The flash unit 24 may be operatively connected to the processor 20A so that the LED light source or other suitable flash source of the flash unit 24 may be controlled or addressed by the processor 20A. The camera 22 may have an ambient light sensing unit for determining the level of ambient light. A lookup table associated with the processor 20A, may store calibration weights for the amount of power to be applied to the flash unit LED or other suitable flash source 24 to compensate for various levels of ambient light sensed by the light sensing unit. If the sensor signal may be below a pre-defined value, the flash unit 24 may be identified as the main source of illumination, and the calibration weight may be selected from the lookup table to produce a correct amount of illumination to enable capturing a good image of the object being photographed.

The mobile wireless device A and wireless memory tag B are each coupled to an NFC controller 16A and NFC controller 16B, respectively, via an NFC controller interface (NCI). The NFC controllers 16A and 16B are capable of exchanging near-field communication (NFC) RF signals, according to an embodiment of the present invention. The mobile wireless device A may request that the NFC controller 16A start discovery by sending a "discover" command. Once discovery has been started, the NFC controller 16A notifies the mobile wireless device A of every detectable target NFC device or tag by sending a Notification with a Status and relevant parameters.

The NFC controller 16A may be embodied as hardware, software, firmware, or a combination of these constructs. It may be an integral part of the mobile wireless device A or it my be an integrated circuit chip or card physically attached to the mobile wireless device A, such as with a flash card adapter. The NFC controller 16A may includes a processor, a read only memory (ROM), and random access memory (RAM). The NFC controller 16A may include an NFC radio or the NFC radio may be separately connected. The NFC controller 16A may include its own battery or it may use power supplied by the mobile wireless device A. The ROM and/or RAM may be a removable memory device such as a smart card, SIM, WIM, semiconductor memory such as RAM, ROM, PROMS, flash memory devices, etc.

NCI firmware in the NFC controller 16A communicates bidirectionally with the NFC controller 16B via magnetic field induction, where two loop antennas are located within each other's near-field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The user may bring the NFC radio on the NFC controller 16A close to the NFC controller 16B of the wireless memory tag B to allow near-field, bidirectional communication between the devices.

When two NFC controllers 16A and 16B are brought into close proximity, they may establish NFC communication based on the NFC Forum Logical Link Control Protocol (LLCP) specification. In example embodiments of the invention, the NFC controller 16A may be a contactless smartcard reader having characteristics similar to those described in the ISO/IEC 14443 proximity-card standard, the smartcard and reader being associated or combined as a single component capable of two-way communication, and may use the ISO/IEC 18092 NFC communication standard.

In accordance with an example embodiment of the invention, the NFC controller 16A of the mobile wireless device A may send an NFC interrogation signal to read the NFC controller 16B of the wireless memory tag B and receive a radio frequency NFC response signal 40 from the tag B. The response signal 40 may indicate that the wireless memory tag B may be capable of receiving optical powering. An initial setup negotiation may be conducted between the mobile wireless device A and the wireless memory tag B, via an NFC connection 40 established between the devices. The mobile wireless device A may receive a radio frequency wireless message from the wireless memory tag B, indicating optical power requirements of the wireless memory tag B. In response, the mobile wireless device A may transmit optical power at a level based on the indicated optical power requirements. Then, in accordance with an example embodiment of the invention, the processor 20A of the mobile wireless device A may switch on the camera flash 24 to transmit the optical power to the wireless memory device B, in response to the indicated optical power requirements.

Figure 1B:
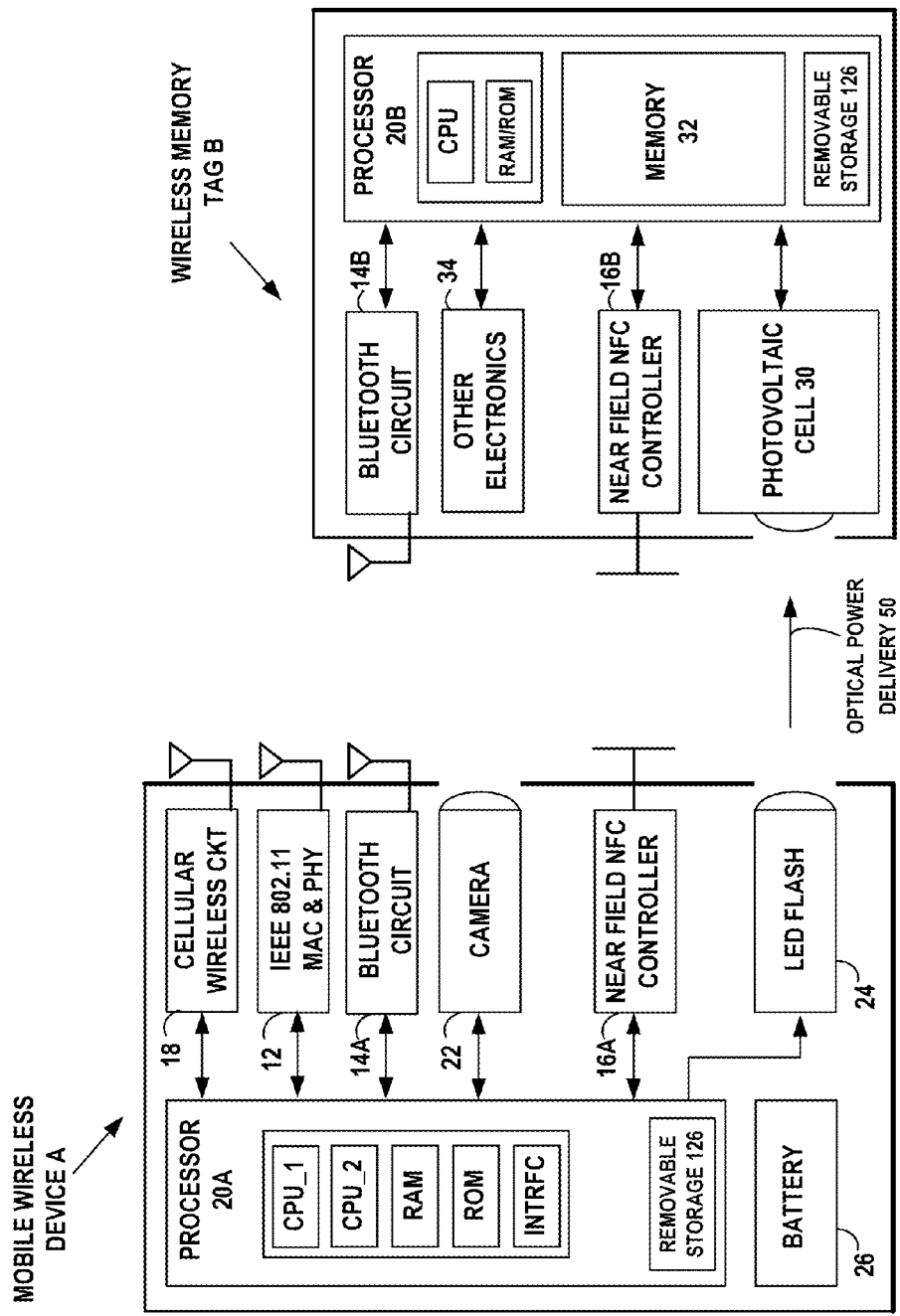
FIG. 1B is an example network diagram of the mobile wireless device A and the wireless memory tag B, performing the supplementary optical power delivery from the mobile wireless device A to the wireless memory tag B. The optical power delivery may use the LED flash of the camera component of the mobile wireless device A to illuminate and energize the photovoltaic cell in the wireless memory tag B, in accordance with example embodiments of the invention.

FIG. 1B is an example network diagram of the mobile wireless device A and the wireless memory tag B of FIG. 1A, performing the supplementary optical power delivery 50 from the mobile wireless device A to the wireless memory tag B. The optical power delivery may be using the LED flash 24 of the camera component 22 of the mobile wireless device A to illuminate and energize the photovoltaic cell 30 in the wireless memory tag B, in accordance with example embodiments of the invention. In accordance with an example embodiment of the invention, the wireless memory tag B may receive the optical power 50 from the mobile wireless device A and use it to operate the memory 32 and electronic components 34 in the tag B, including accessing, reading from and writing into the memory module 34 in the tag B.

In accordance with an example embodiment of the invention, the mobile wireless device A may receive an NFC message from the wireless memory tag B, indicating a change in optical power requirements of the tag B. In response, the mobile wireless device A may adjust the optical power 50 that it transmits, based on the indicated change in optical power requirements.

In accordance with an example embodiment of the invention, the mobile wireless device A may transmit optical power 50 to the wireless memory tag B, which provides energy to the wireless memory tag B, to supplement energy provided to the wireless memory tag B by the near field communications (NFC) signal 40.

In accordance with an example embodiment of the invention, the mobile wireless device A may receive an NFC message from the wireless memory tag B, indicating no more optical power 50 may be required by the tag B and, in response, the processor 20A in the mobile wireless device A may switch off the camera flash 24 in the mobile wireless device A.

In accordance with an embodiment of the invention, mobile wireless device A may further include a Bluetooth transceiver 14A, a IEEE 802.11 WLAN transceiver 12A, and a cellular telephone transceiver 18A. The cellular telephone transceiver 18A may be based on Wide Area (WAN) communications protocols that include e.g. Global System for Mobile Communications (GSM), General Packet Radio service (GPRS), Enhanced data rates for GSM evolution (EDGE), Evolution-Data Optimized (EV-DO), Wideband Code Division Multiple Access (W-CDMA), Long Term Evolution (LTE), and Long Term Evolution Advanced (LTE-Advanced).

Figure 1C:
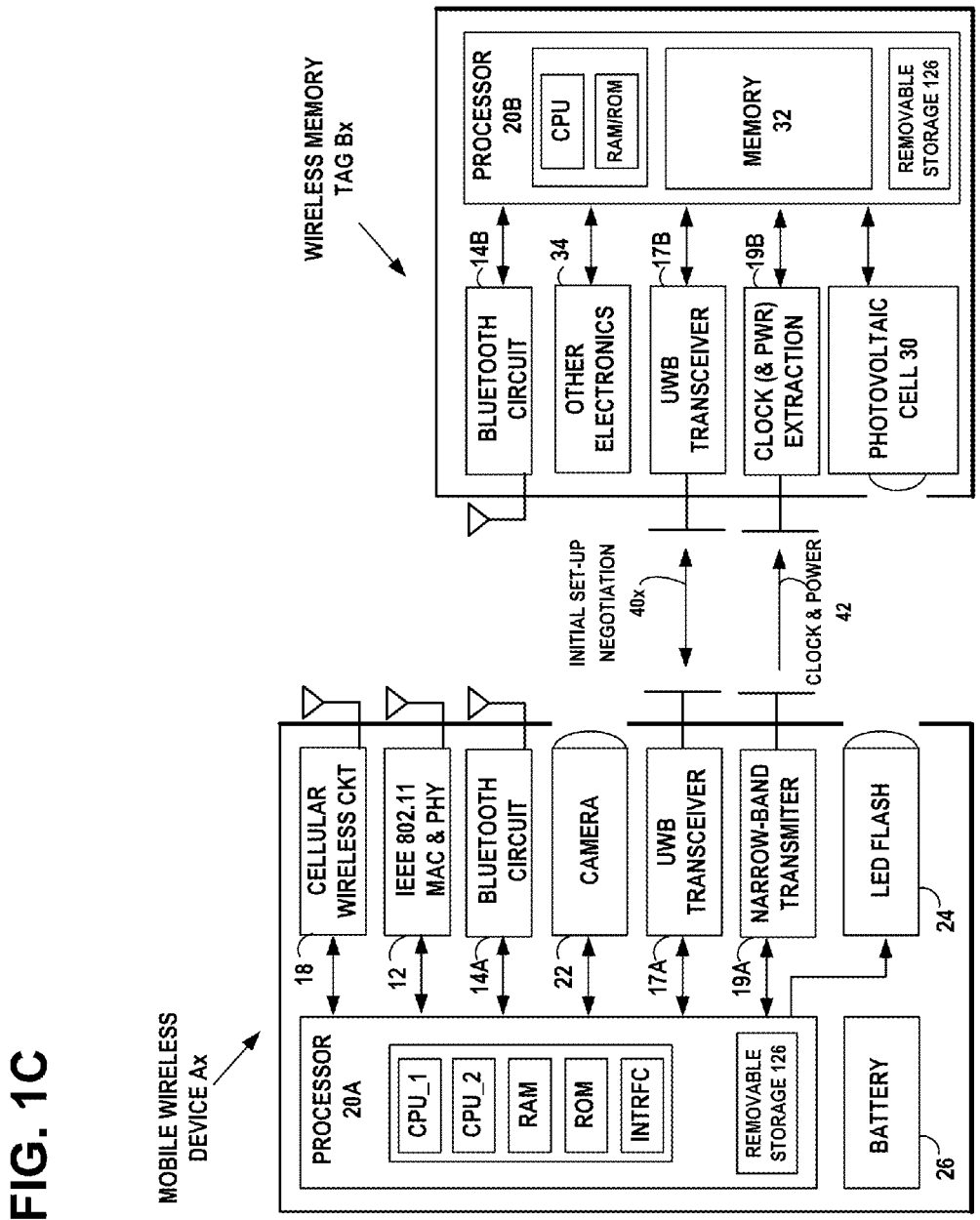
FIG. 1C is an example network diagram of a mobile wireless device Ax and a wireless memory tag Bx, performing an initial setup negotiation using a combined UWB and narrow-band wireless memory tag technology. The negotiation may establish supplementary optical power delivery from the mobile wireless device Ax to the wireless memory tag Bx, in accordance with example embodiments of the invention.

FIG. 1C is an example network diagram of a mobile wireless device Ax and a wireless memory tag Bx, performing an initial setup negotiation 40 using a combined UWB and narrow-band wireless memory tag technology. The negotiation may be to establish supplementary optical power delivery from the mobile wireless device Ax to the wireless memory tag Bx, in accordance with example embodiments of the invention.

The mobile wireless device Ax may include both a narrow-band transmitter 19A to provide both power and clock signals 42 to a wireless memory tag Bx. The mobile wireless device Ax may further include an ultra-wide band transceiver 17A to transmit and receive ultra-wide band signals with the wireless memory tag Bx, at a very high data rate within reference time frames established by the narrow-band clock signals. Correspondingly, the wireless memory tag Bx may include a wireless module 19B to extract the narrow-band clock signal and wireless power signal 42 to establish the reference time frames and to receive the operating power from the mobile wireless device Ax. The wireless memory module Bx may further include an ultra-wide band transceiver 17B to transmit and receive the ultra-wide band signals with the mobile wireless device Ax, at the very high data rate within the reference time frames established by the narrow-band clock signals. Clock extraction may not always be mandatory but preferable for power saving and simpler synchronization.

The narrow-band signal may have an example frequency in the range of 860 MHz to 960 MHz or 13.65 MHz. The bandwidth of the narrow band signal depends on embodiment and may be for example, 50 kHz to 1 MHz. The synchronization signal provides a timing reference for wireless memory tags Bx that are within range. The timing reference provides a resolution of one period, of the synchronization signal, referred to as an elementary time unit, ETU. For instance, if the frequency of the synchronization signal 152 is 900 MHz, 1 ETU≈1.1 ns.

The ultra-wide band transceiver 17A/17B may have an example frequency of 7.9 GHz. In an example embodiment, the modulation of the ultra-wide band signal is on-off keying (OOK) modulation with one pulse per symbol, and every symbol is divided into X ETUs. For example: X=64 and ETU ~1.1 ns=>14.2 Msymbols/second or 14.2 Mbps when one bit is represented by one symbol. In other words, a pulse repetition period (PRP) or a radio frame lasts X ETUs, wherein X is, for instance, 8, 16, 32 or 64.

The radio frame may be also divided into slots where one slot lasts for example 16 ETUs and thus one PRP equals to four slots (still assuming that X is 64). One given slot of the frame may be used by one tag for transmitting (or receiving) a pulse. A symbol may be represented by X successive pulses. Each pulse may last for at least one ETU. In this example embodiment, one pulse may extend over two or more ETUs. Thus, the ultra-wide band transceiver may send pulses to test a given timing offset (e.g. 0 to 63 ETUs from starting of the PRP), which the wireless memory tag may receive after a pulse transfer delay that may be caused, for example, by radio propagation delay and signal processing delays. The response pulses from the wireless memory tag may be sent with another pulse transfer delay. Assume that the pulses and the sensitivity periods each cover two ETUs and the wireless memory tag is constructed to advance its transmissions that much, so that if the wireless memory tag is touching the mobile wireless device Ax, the tail of a pulse sent by the wireless memory tag Bx is detected by the mobile wireless device Ax in one pulse. When such a wireless memory tag Bx is separated by a range matching with the radio propagation delay of one ETU, the response pulses become delayed by two ETUs (down- and uplinks combined), but still the response pulses co-inside with one ETU within the reception sensitivity period of the ultra-wide band transceiver. Thus, the wireless memory tag Bx may reside anywhere within the range corresponding to radio propagation during one ETU i.e. some 33 cm in case of 900 MHz, narrow-band synchronization signal.

In accordance with an example embodiment of the invention, an initial setup negotiation may be conducted between the mobile wireless device Ax and the wireless memory tag Bx, via the ultra-wide bandwidth connection 40x established between the devices. The mobile wireless device Ax may receive a radio frequency wireless message from the wireless memory tag Bx, indicating optical power requirements of the wireless memory tag Bx. In response, the mobile wireless device Ax may transmit optical power at a level based on the indicated optical power requirements. Then, in accordance with an example embodiment of the invention, the processor 20A of the mobile wireless device Ax may switch on the camera flash 24 to transmit the optical power to the wireless memory device Bx, in response to the indicated optical power requirements.

In accordance with an example embodiment of the invention, the memory tag may have a single-frequency band radio interface. If single-frequency band radio interface is a narrow-band signal (like 13.56 MHz NFC), then the data-rate may be limited (but the efficiency of wireless powering is better). A limited data rate is useful when the memory size of the wireless memory tag is limited. If single-frequency band radio interface is a wide-band signal, the data-rate is better for fast memory access in the tag (but efficiency of wireless powering decreases). A high data rate supports larger memories, but wireless powering limits the memory capacity and speed of memory.

In accordance with an example embodiment of the invention, the wireless memory tag may have a dual-frequency band radio interface. By using two frequencies (one primarily for wireless powering, and the other one for high bandwidth) the performance of the wireless memory tag may be improved.

In both cases additional optical powering improves the performance of memory access in wireless memory tag (results as better overall/end-to-end performance).

Figure 1D:
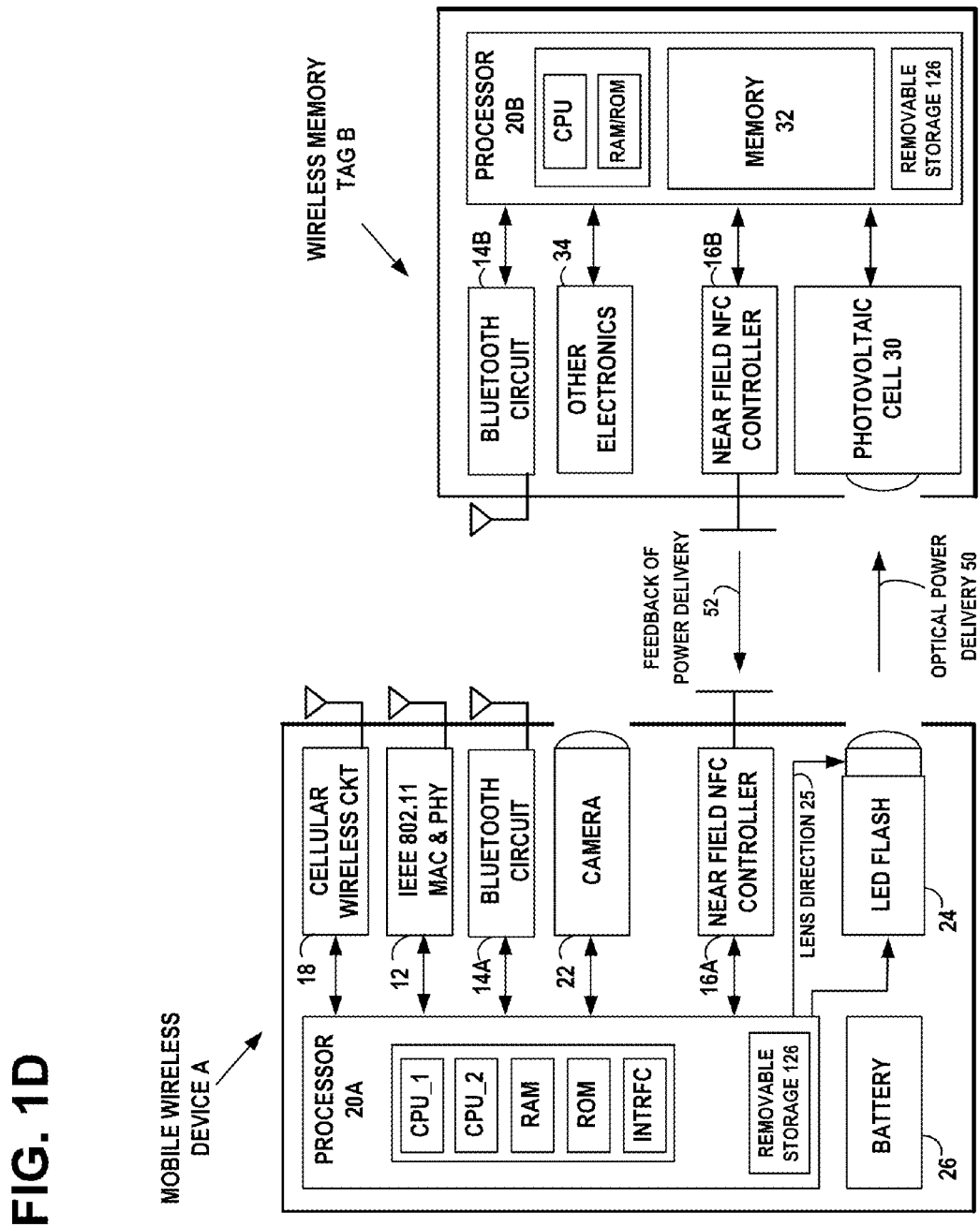
FIG. 1D is an example network diagram of the mobile wireless device A and the wireless memory tag B of FIG. 1A, where a feedback signal from the wireless memory tag B indicates the received level of optical power being delivered to its photovoltaic cell. In response, the mobile wireless device A uses the feedback signal to generate a lens direction control signal to the lens of the LED flash. The lens direction control signal may transversely sweep the direction of the optical beam issuing from the LED flash so as to target the beam more closely onto the photovoltaic cell in the wireless memory tag B, in accordance with example embodiments of the invention.

FIG. 1D is an example network diagram of the mobile wireless device A and the wireless memory tag B of FIG. 1A, where a feedback signal 52 from the NFC controller 16B of the wireless memory tag B indicates the received level of optical power 50 being delivered to its photovoltaic cell 30. In response, the mobile wireless device A uses the feedback signal 52 to generate a lens direction control signal 25 to the lens of the LED flash 24. The lens direction control signal may be to transversely sweep the direction of the optical beam 50 issuing from the LED flash 24 so as to target the beam 50 more closely onto the photovoltaic cell 30 in the wireless memory tag B, in accordance with example embodiments of the invention. In an example embodiment of the invention, the feedback signal 52 may be used by mobile wireless device A to display information to the user, on a graphical user interface (not shown). The information may be a graphical indication of how to reposition the mobile wireless device A with respect to the wireless memory tag B, so as to target the beam 50 more closely onto the photovoltaic cell 30 in the wireless memory tag B. In an example embodiment of the invention, the feedback signal 52 may be used by mobile wireless device A to control the intensity of the optical power 50 being delivered by the mobile wireless device A to the photovoltaic cell 30 of the wireless memory tag B. In an example embodiment of the invention, the feedback signal 52 may be used by mobile wireless device A to generate a vibratory signal to the user. The vibratory signal may indicate how to reposition the mobile wireless device A with respect to the wireless memory tag B, so as to target the beam 50 more closely onto the photovoltaic cell 30 in the wireless memory tag B.

Figure 2A:
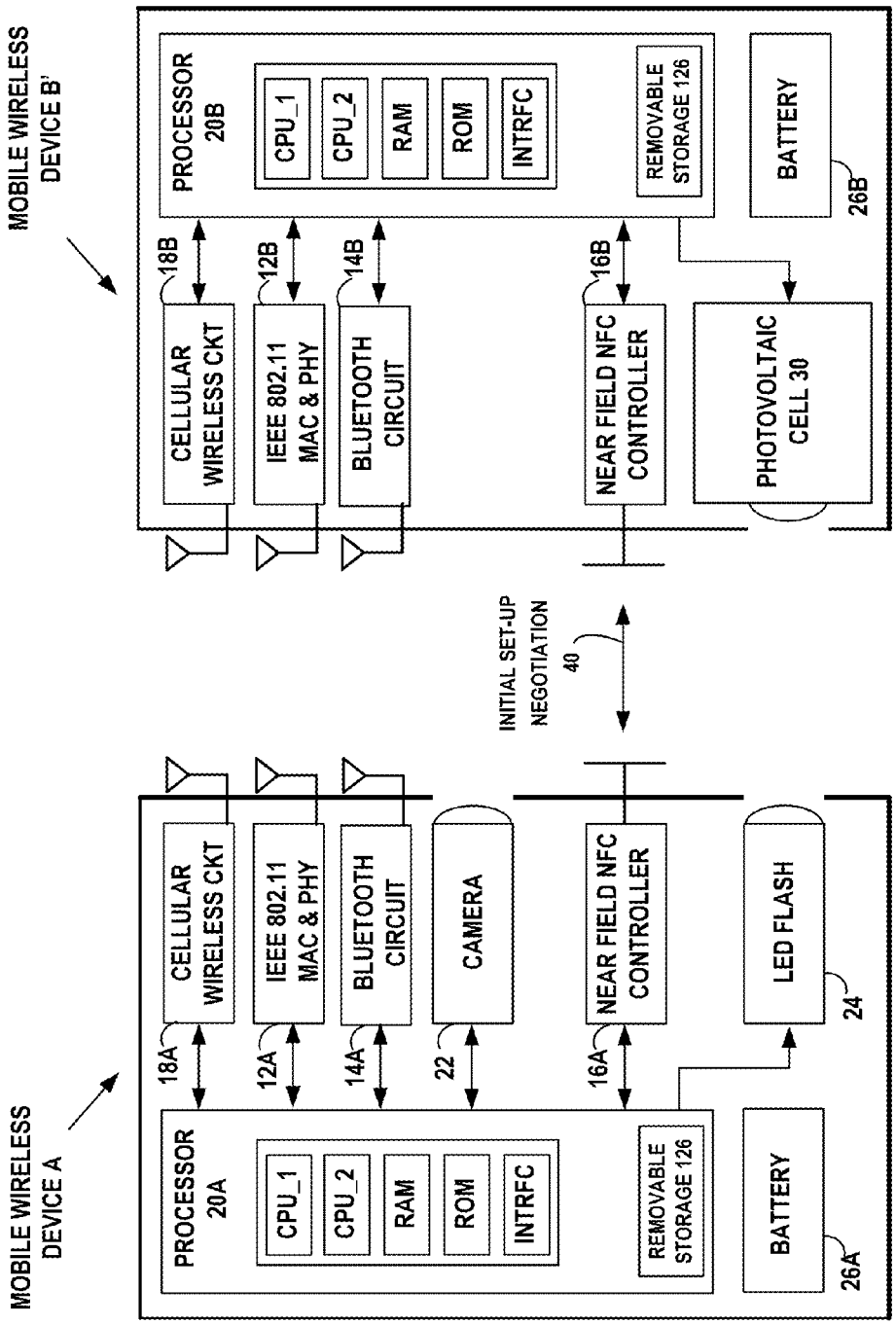
FIG. 2A is an example network diagram of a first mobile wireless device A and a second mobile wireless device B', performing an initial setup negotiation using a Near Field Communications (NFC) connection. The negotiation may establish supplementary optical power delivery from the first mobile wireless device A to the second mobile wireless device B', in accordance with example embodiments of the invention.

FIG. 2A is an example network diagram of a first mobile wireless device A and a second mobile wireless device B', performing an initial setup negotiation using a Near Field Communications (NFC) connection 40. The negotiation may establish supplementary optical power delivery from the first mobile wireless device A to the second mobile wireless device B', in accordance with example embodiments of the invention. In accordance with an example embodiment of the invention, both the mobile wireless device A and the mobile wireless device B' may be a communications device, PDA, cell phone, laptop or palmtop computer, or the like. Both the mobile wireless device A and the mobile wireless device B' may have the same or similar components as are depicted in the FIG. 1A for the mobile device A and the wireless memory tag B.

In accordance with an example embodiment of the invention, the NFC controller 16A of the mobile wireless device A may send an NFC interrogation signal to read the NFC controller 16B of the mobile wireless device B' and receive a radio frequency NFC response signal 40 from the mobile wireless device B'. The response signal 40 may indicate that the mobile wireless device B' is capable of receiving optical powering. An initial setup negotiation may be conducted between the mobile wireless device A and the mobile wireless device B', via an NFC connection 40 established between the devices. The mobile wireless device A may receive a radio frequency wireless message from the mobile wireless device B', indicating optical power requirements of the mobile wireless device B'. In response, the mobile wireless device A may transmit optical power at a level based on the indicated optical power requirements. Then, in accordance with an example embodiment of the invention, the processor 20A of the mobile wireless device A may switch on the camera flash 24 to transmit the optical power to the mobile wireless device B', in response to the indicated optical power requirements.

Figure 2B:
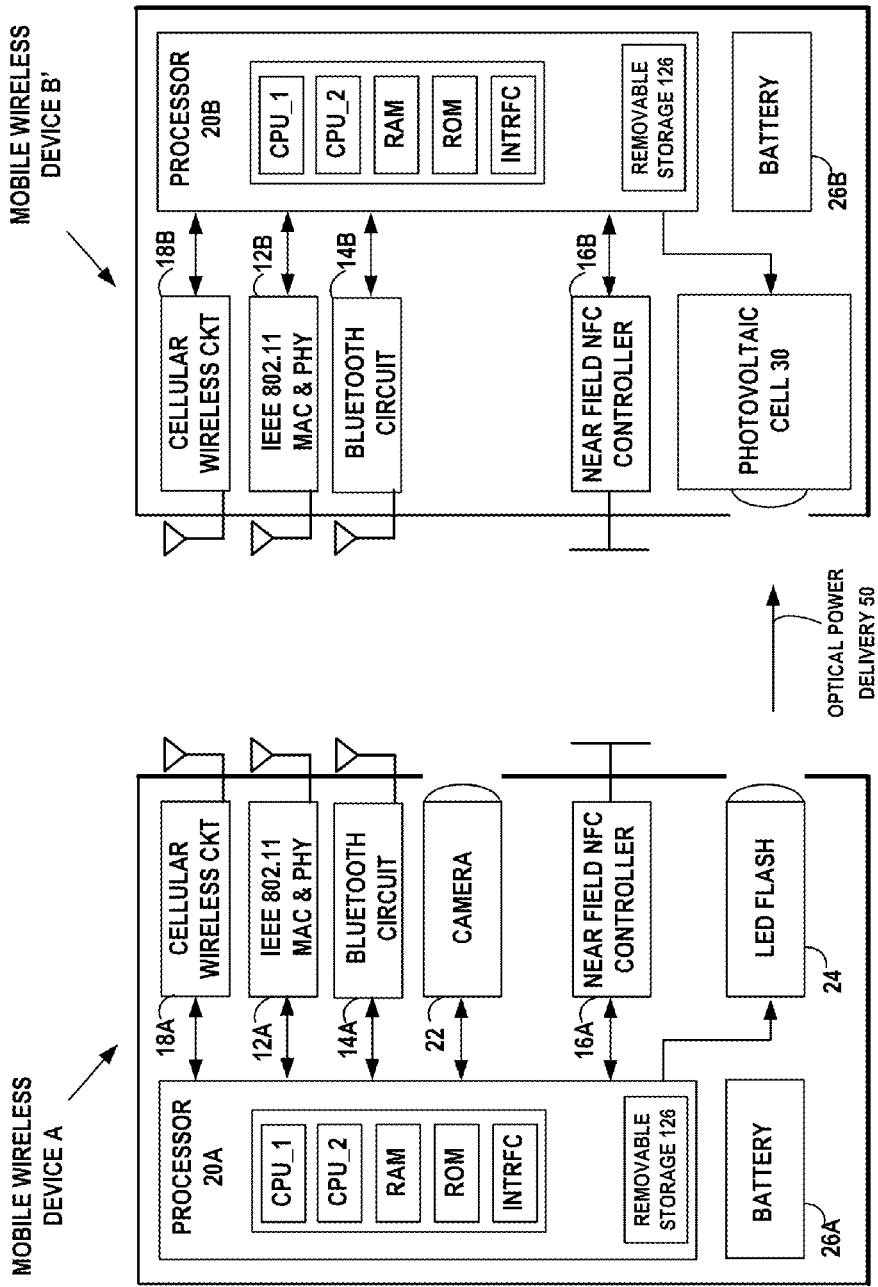
FIG. 2B is an example network diagram of the first mobile wireless device A and the second mobile wireless device B, performing the supplementary optical power delivery from the first mobile wireless device A to the second mobile wireless device B. The optical power delivery may use the LED flash of the camera component of the first mobile wireless device A to illuminate and energize the photovoltaic cell in the second mobile wireless device B, in accordance with example embodiments of the invention.

FIG. 2B is an example network diagram of the first mobile wireless device A and the second mobile wireless device B' of FIG. 2A, performing the supplementary optical power delivery 50 from the first mobile wireless device A to the second mobile wireless device B'. The optical power delivery may use the LED flash 24 of the camera component 22 of the first mobile wireless device A to illuminate and energize the photovoltaic cell 30 in the second mobile wireless device B', in accordance with example embodiments of the invention.

Figure 2C:
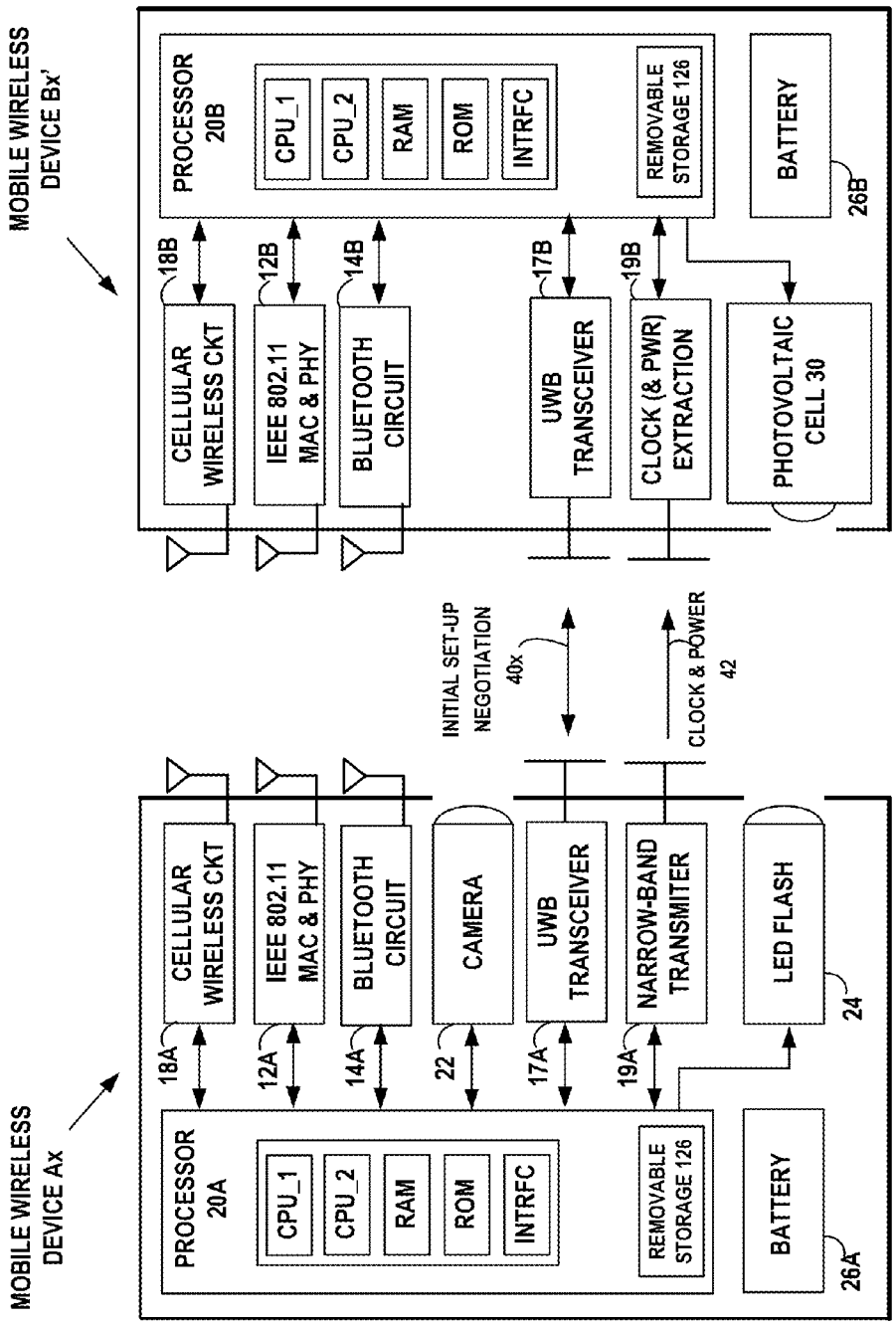
FIG. 2C is an example network diagram of a first mobile wireless device Ax' and a second mobile wireless device Bx', performing an initial setup negotiation using a combined UWB and narrow-band wireless memory tag technology. The negotiation may establish supplementary optical power delivery from the first mobile wireless device Ax' to the second mobile wireless device Bx', in accordance with example embodiments of the invention.

FIG. 2C is an example network diagram of a first mobile wireless device Ax' and a second mobile wireless device Bx', performing an initial setup negotiation 40x using a combined UWB and narrow-band wireless memory tag technology. The negotiation may establish supplementary optical power delivery from the first mobile wireless device Ax' to the second mobile wireless device Bx', in accordance with example embodiments of the invention.

The mobile wireless device Ax may include both a narrow-band transmitter 19A to provide both power and clock signals 42 to a mobile wireless device Bx'. The mobile wireless device Ax may further include an ultra-wide band transceiver 17A to transmit and receive ultra-wide band signals with the mobile wireless device Bx', at a very high data rate within reference time frames established by the narrow-band clock signals. Correspondingly, the mobile wireless device Bx' may include a wireless module 19B to extract the narrow-band clock signal and wireless power signal 42 to establish the reference time frames and to receive the operating power from the mobile wireless device Ax. The wireless memory module Bx may further include an ultra-wide band transceiver 17B to transmit and receive the ultra-wide band signals with the mobile wireless device Ax, at the very high data rate within the reference time frames established by the narrow-band clock signals.

The narrow-band signal may have an example frequency in the range of 860 MHz to 960 MHz or 13.56 MHz. The bandwidth of the narrow band signal depends on embodiment and may be for example, 50 kHz to 1 MHz. The synchronization signal provides a timing reference for wireless memory tags Bx that are within range. The timing reference provides a resolution of one period, of the synchronization signal, referred to as an elementary time unit, ETU. For instance, if the frequency of the synchronization signal 152 is 900 MHz, 1 ETU≈1.1 ns.

The ultra-wide band transceiver 17A/17B may have an example frequency of 7.9 GHz. In an example embodiment, the modulation of the ultra-wide band signal is on-off keying (OOK) modulation with one pulse per symbol, and every symbol is divided into X ETUs. For example: X=64 and ETU ~1.1 ns=>14.2 Msymbols/second or 14.2 Mbps when one bit is represented by one symbol. In other words, a pulse repetition period (PRP) or a radio frame lasts X ETUs, wherein X is, for instance, 8, 16, 32 or 64.

The radio frame may be also divided into slots where one slot lasts for example 16 ETUs and thus one PRP equals to four slots (still assuming that X is 64). One given slot of the frame may be used by one tag for transmitting (or receiving) a pulse. A symbol may be represented by X successive pulses. Each pulse may last for at least one ETU. In this example embodiment, one pulse may extend over two or more ETUs. Thus, the ultra-wide band transceiver may send pulses to test a given timing offset (e.g. 0 to 63 ETUs from starting of the PRP), which the wireless memory tag may receive after a pulse transfer delay that may be caused, for example, by radio propagation delay and signal processing delays. The response pulses from the wireless memory tag may be sent with another pulse transfer delay. Assume that the pulses and the sensitivity periods each cover two ETUs and the wireless memory tag is constructed to advance its transmissions that much, so that if the wireless memory tag is touching the mobile wireless device Ax, the tail of a pulse sent by the mobile wireless device Bx' is detected by the mobile wireless device Ax in one pulse. When such a mobile wireless device Bx' is separated by a range matching with the radio propagation delay of one ETU, the response pulses become delayed by two ETUs (down- and uplinks combined), but still the response pulses co-inside with one ETU within the reception sensitivity period of the ultra-wide band transceiver. Thus, the mobile wireless device Bx' may reside anywhere within the range corresponding to radio propagation during one ETU i.e. some 33 cm in case of 900 MHz, narrow-band synchronization signal.

In accordance with an embodiment of the invention, an initial setup negotiation may be conducted between the mobile wireless device Ax and the mobile wireless device Bx', via the ultra-wide bandwidth connection 40x established between the devices. The mobile wireless device Ax may receive a radio frequency wireless message from the mobile wireless device Bx', indicating optical power requirements of the mobile wireless device Bx'. In response, the mobile wireless device Ax may transmit optical power at a level based on the indicated optical power requirements. Then, in accordance with an example embodiment of the invention, the processor 20A of the mobile wireless device Ax may switch on the camera flash 24 to transmit the optical power to the mobile wireless device Bx', in response to the indicated optical power requirements.

Figure 3:
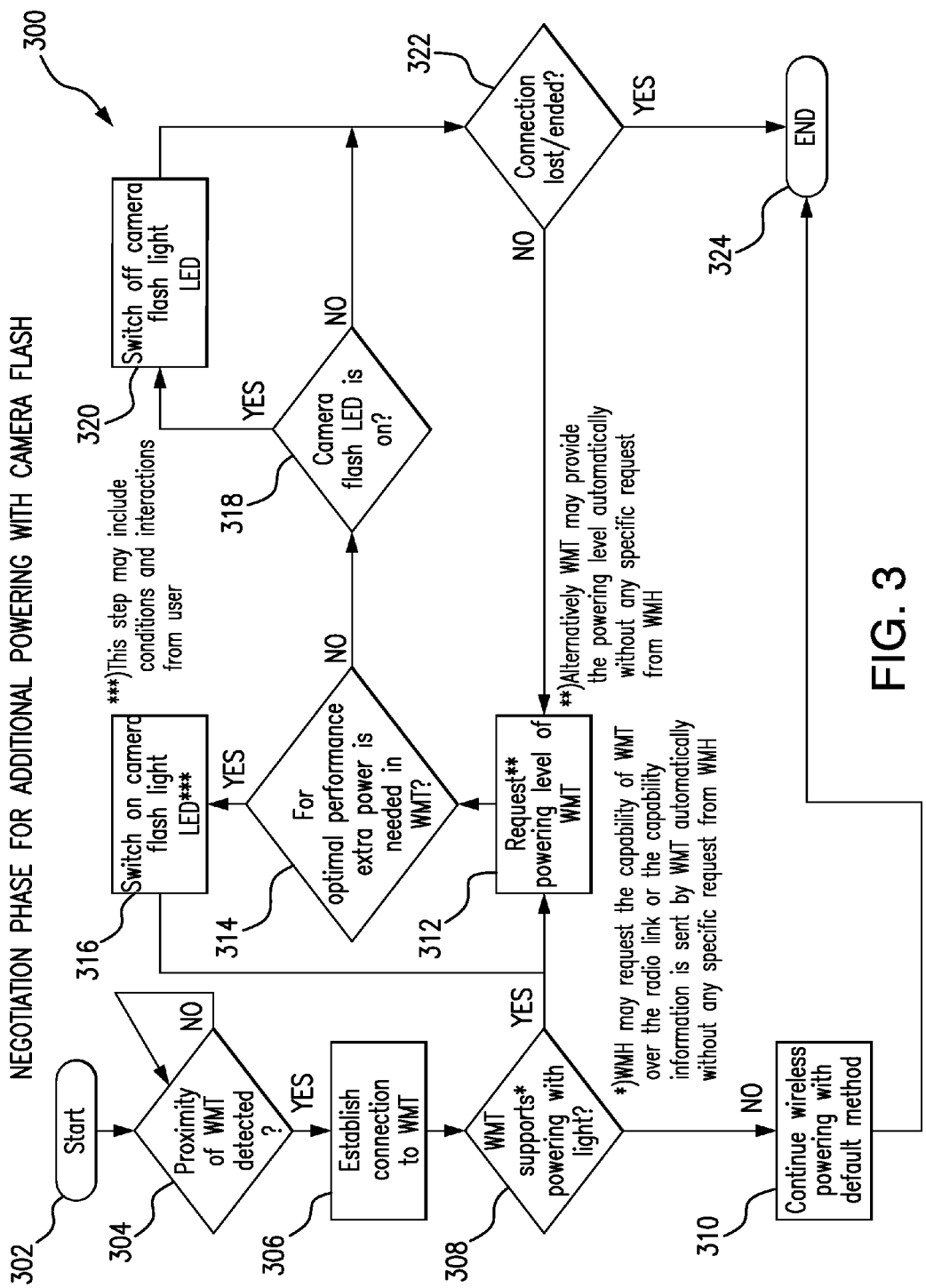
FIG. 3 is an example flow diagram of the process performed by first mobile wireless device A in the initial setup negotiation using a Near Field Communications (NFC) or ultra wideband communications connection. The negotiation may establish supplementary optical power delivery from the first mobile wireless device A to the second mobile wireless device B, in accordance with example embodiments of the invention.

FIG. 3 is an example flow diagram 300 of the process performed by first mobile wireless device A in the initial setup negotiation using e.g. a Near Field Communications (NFC) or ultra wideband communications connection. The negotiation may establish supplementary optical power delivery from the first mobile wireless device A to the second mobile wireless device B, in accordance with example embodiments of the invention. The steps of the flow diagram represent computer code instructions stored in the RAM and/or ROM memory of the mobile wireless device A, which when executed by the central processing units (CPU), carry out the functions of the example embodiments of the invention. The abbreviation WMH (Wireless Memory Host) in the figure, refers to the reader/writer device of the Wireless Memory Tags (WMT). The steps of the example method are as follows.

Step 302: Start
Step 304: Proximity of tag detected?
Step 306: Establish connection to tag.
Step 308: Tag supports powering with light?
Step 310: NO: Continue wireless powering with default method.
Step 312: Yes: Request powering level of tag.
Step 314: For optimal performance is extra power needed?
Step 316: YES: Switch on camera flash LED.
Step 318: NO: Is camera flash LED on?
Step 320: YES: Switch LED off.
Step 322: NO: Is connection lost or ended?
Step 324: YES: End In accordance with an alternate example embodiment of the invention, the Wireless Memory Tag (WMT) may provide the powering level automatically without any specific request from the Wireless Memory Host (WMH). In accordance with an alternate example embodiment of the invention, the mobile wireless device may have already turned on the optical powering at the start, after which the tag informs that mobile wireless device about the actual optical powering requirements, that is, the reception of the optical power signal by the tag triggers the tag to inform the mobile wireless device about the powering requirements. In accordance with an alternate example embodiment of the invention, the Wireless Memory Tag (WMT) may inform the Wireless Memory Host (WMH) by radio about the optical powering requirements, 1) either after a request by radio, 2) without any specific request, or 3) when it detects that optical power is available.

Figure 3A:
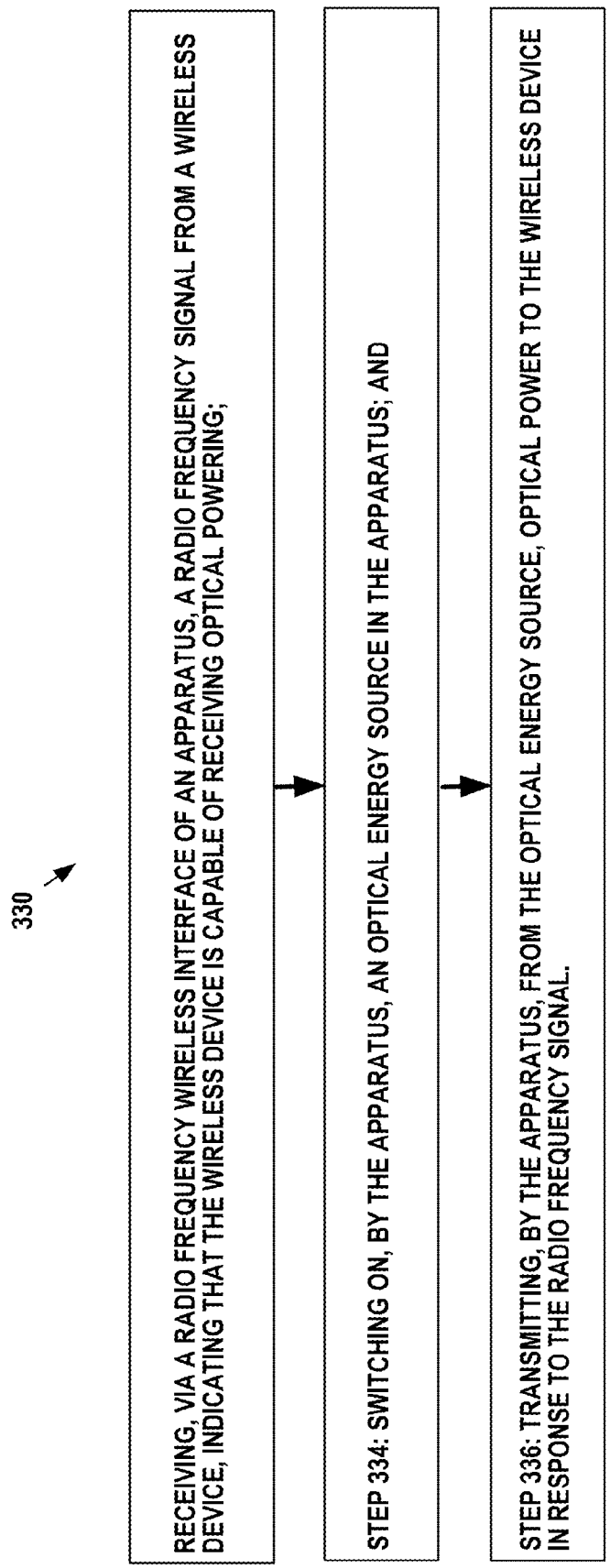
FIG. 3A is an example flow diagram of the process performed by mobile wireless device A, in accordance with example embodiments of the invention.

FIG. 3A is an example flow diagram 330 of the process performed by mobile wireless device A, in accordance with example embodiments of the invention. The steps of the flow diagram represent computer code instructions stored in the RAM and/or ROM memory of the mobile wireless device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 332: receiving, via a radio frequency wireless interface of an apparatus, a radio frequency signal from a wireless device, indicating that the wireless device is capable of receiving optical powering;
Step 334: switching on, by the apparatus, an optical energy source in the apparatus; and
Step 336: transmitting, by the apparatus, from the optical energy source, optical power to the wireless device in response to the radio frequency signal.

FIG. 3B is an example flow diagram 360 of the process performed by the second wireless device B', in accordance with example embodiments of the invention. The steps of the flow diagram represent computer code instructions stored in the RAM and/or ROM memory of the second wireless device B', which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 362: transmitting, by an apparatus, a radio frequency signal to a mobile wireless device, indicating that the apparatus is capable of receiving optical powering;
Step 364: receiving, by the apparatus, optical power from the mobile wireless device in response to the radio frequency signal; and
Step 366: operating, by the apparatus, electronic components in the apparatus, using at least the optical power from the mobile wireless device.

Figure 4:
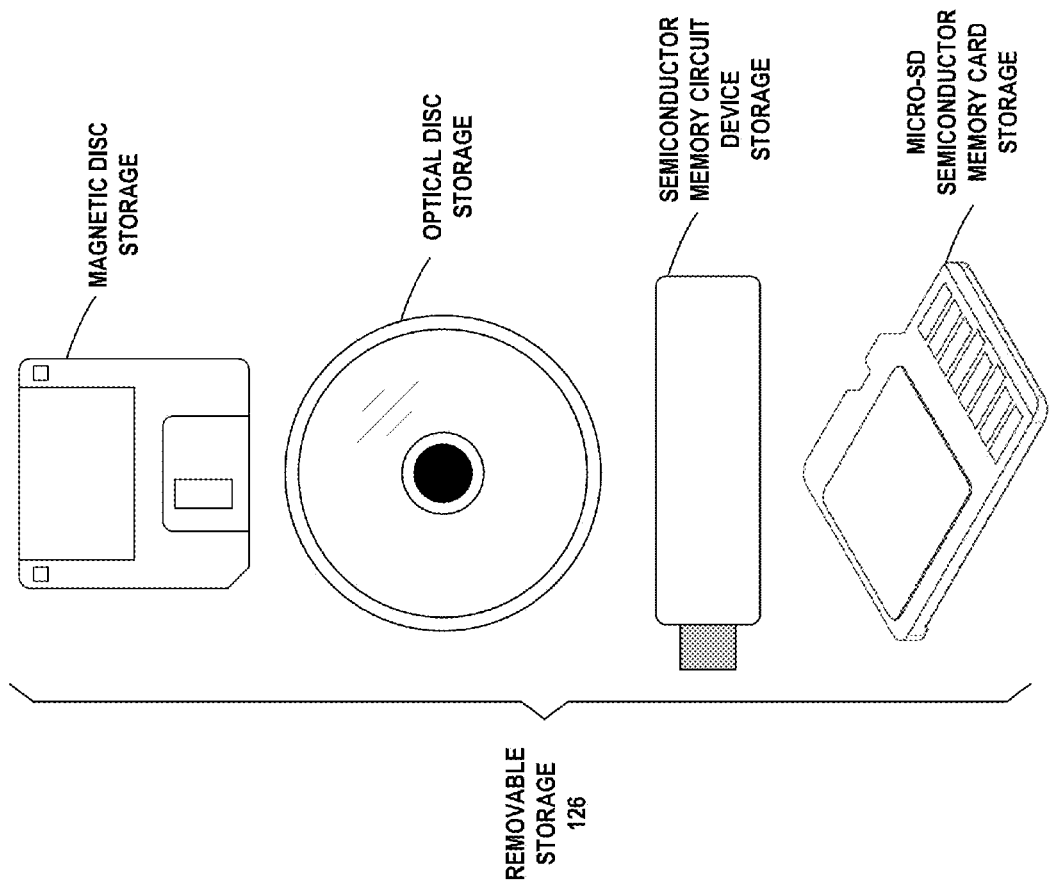
FIG. 4 illustrates an example embodiment of the invention, wherein examples of removable storage media are shown. The removable storage media are based on magnetic, electronic and/or optical technologies. Examples include magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 4 illustrates an example embodiment of the invention, wherein examples of removable storage media 126 are shown. The removable storage media may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In accordance with an example embodiment of the invention, more energy is provided to a wireless memory device, which contains a non-volatile memory circuit, including relevant controls and interfaces. In accordance with an example embodiment of the invention, the wireless memory device may contain at least one radio to make it possible to transfer data wirelessly to and from the memory of the device. In accordance with an example embodiment of the invention, the wireless memory device may be a "tag" or have any other form factor, shape or configuration. It may be seen as a wirelessly accessed memory card. Typically, the wireless memory device does not have a battery, but it may contain at least some type of energy storage.

In an example embodiment, the wireless transceiver carrier in device A and device B' may be a suitable short-range communications protocol, such as Radio Frequency Identification (RFID), Near Field Communication (NFC), Infrared Data Association (IrDA), or Ultra Wide Band (UWB), for example.

An example of the Radio Frequency Identification (RFID) out-of-band short-range carrier is described, for example, ISO 11785 (air interface protocol), ISO 14443 (air interface protocol), and ISO 15693, incorporated herein by reference.

An example of the Near Field Communication (NFC) out-of-band short-range carrier is described, for example, in ISO/IEC 14443 and ISO/IEC 18092, incorporated herein by reference.

An example of the Infrared Data Association (IrDA) out-of-band short-range carrier is described, for example, in *IrDA Link Access Protocol*, v1.1 (1996), incorporated herein by reference.

An example of the Ultra Wide Band (UWB) out-of-band short-range carrier is described, for example, in *WiMedia Common Radio Platform Specification*, Version 1.5 (2010), incorporated herein by reference.

In principle, the radio frequency signal may be generated by any radio that may operate at the power available in the tag. Although near field communications signal or an ultra-wide bandwidth signal are the most likely ones, but it may be possible to use others. In example embodiments, the radio frequency signal may be generated by a suitable communications protocol, such as a Vehicle Area (WVAN) communications protocol, Wireless Video Networks (WVAN-TV) communications protocol, Personal Area (WPAN) communications protocol, Local Area (WLAN) communications protocol, or Wide Area (WAN) communications protocol, using the standard procedures and primitives defined by the respective standards. Personal Area (WPAN) communications protocols include Bluetooth BR/EDR, Bluetooth Low Energy, Wireless USB (WUSB), Ultra Wide-band (UWB), ZigBee (IEEE 802.15.4, or IEEE 802.15.4a) for short range communication between devices. Local Area (WLAN) communications protocols include IEEE 802.11, digital enhanced cordless telecommunications (DECT) and HIPERLAN. Wide Area (WAN) communications protocols include e.g. Global System for Mobile Communications (GSM), General Packet Radio service (GPRS), Enhanced data rates for GSM evolution (EDGE), Evolution-Data Optimized (EV-DO), Wideband Code Division Multiple Access (W-CDMA), Long Term Evolution (LTE), and Long Term Evolution Advanced (LTE-Advanced).

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   receiving, via a radio frequency wireless interface of an apparatus, one or more radio frequency signals from a wireless device, the one or more radio frequency signals indicating that the wireless device is capable of receiving optical powering and optical power requirements of the wireless device;
   exchanging, by the apparatus, radio frequency wireless messages with the wireless device via the radio frequency wireless interface, to negotiate optical power delivery from the apparatus to the wireless device;
   switching on, by the apparatus, an optical energy source in the apparatus; and
   transmitting, by the apparatus, from the optical energy source, optical power to the wireless device at a power level associated with the optical power requirements in response to the received one or more radio frequency wireless signals.

2. The method of claim 1, further comprising:
   exchanging, via the radio frequency wireless interface of the apparatus, radio frequency wireless messages including data to be communicated with the wireless device.

3. The method of claim 1, further comprising:
   receiving, by the apparatus, a radio frequency wireless message from the wireless device, indicating no more optical power is required by the wireless device; and
   switching off, by the apparatus, the optical energy source in the apparatus.

4. The method of claim 1, wherein the apparatus is a mobile device that includes a camera and the optical energy source in the apparatus comprises an optical flash associated with the camera.

5. A method, comprising:
   transmitting, via a radio frequency wireless interface of an apparatus, a radio frequency signal providing initial power for a wireless device, the signal comprising at least one of a near field communication signal and a radio frequency identification signal;
   receiving, via the radio frequency wireless interface, a radio frequency signal from the wireless device in response to the transmitted radio frequency signal, the radio frequency signal indicating that the wireless device is capable of receiving optical powering;
   exchanging, by the apparatus, wireless radio frequency messages with the wireless device to negotiate optical power delivery from the apparatus;
   switching on, by the apparatus, an optical energy source in the apparatus; and
   transmitting, by the apparatus, optical power to the wireless device in response to the exchanged radio frequency messages.

6. An apparatus, comprising:
   an optical energy source;
   a radio frequency wireless interface;
   at least one processor;
   at least one memory including computer program code;

the at least one memory and the computer program code configured to, with the at least one processor, cause the apparatus at least to:

receive, via the radio frequency wireless interface, one or more a radio frequency signals from a wireless device, the one or more radio frequency signals indicating that the wireless device is capable of receiving optical powering and optical power requirements of the wireless device;

exchange radio frequency wireless messages with the wireless device via the radio frequency wireless interface, to negotiate optical power delivery from the apparatus to the wireless device;

switch on the optical energy source in the apparatus; and transmit, from the optical energy source, optical power to the wireless device at a power level associated with the optical power requirements in response to the received one or more radio frequency wireless signals.

7. The apparatus of claim 6, further comprising:
the at least one memory and the computer program code configured to, with the at least one processor, cause the apparatus at least to:
exchange, via the radio frequency wireless interface, radio frequency wireless messages including data to be communicated with the wireless device.

8. The apparatus of claim 6, further comprising:
the at least one memory and the computer program code configured to, with the at least one processor, cause the apparatus at least to:
receive a radio frequency wireless message from the wireless device, indicating no more optical power is required by the wireless device; and
switch the optical energy source in the apparatus.

9. The apparatus of claim 6, wherein the apparatus is a mobile device that includes a camera and the optical energy source in the apparatus comprises an optical flash associated with the camera.

10. An apparatus comprising:
an optical energy source;
a radio frequency wireless interface;
at least one processor;
at least one memory including computer program code;
the at least one memory and the computer program code configured to, with the at least one processor, cause the apparatus at least to:
transmit, via a radio frequency wireless interface of an apparatus, a radio frequency signal providing initial power for a wireless device, the signal comprising at least one of a near field communication signal and a radio frequency identification signal;
receive, via a radio frequency wireless interface, a radio frequency signal from the wireless device, the radio frequency signal indicating that the wireless device is capable of receiving optical powering;
exchange, by the apparatus, wireless radio frequency messages with the wireless device to negotiate optical power delivery from the apparatus;
switch on, by the apparatus, an optical energy source in the apparatus; and
transmit optical power to the wireless device in response to the received radio frequency signal.

11. A computer program product comprising computer executable program code recorded on a computer readable non-transitory storage medium, the computer executable program code comprising:
code for receiving, via a radio frequency wireless interface of an apparatus, one or more radio frequency signals from a wireless device, the one or more radio frequency signals indicating that the wireless device is capable of receiving optical powering and optical power requirements of the wireless device;

code for exchanging, by the apparatus, radio frequency wireless messages with the wireless device via the radio frequency wireless interface, to negotiate optical power delivery from the apparatus to the wireless device;

code for switching on, by the apparatus, an optical energy source in the apparatus; and code for transmitting, by the apparatus, from the optical energy source, optical power to the wireless device at a power level associated with the optical power requirements in response to the received one or more radio frequency wireless signals.

12. A method, comprising:
transmitting, by an apparatus, one or more radio frequency signals to a mobile wireless device, the one or more radio frequency signals indicating that the apparatus is capable of receiving optical powering and optical power requirements of the apparatus;

exchanging, by the apparatus, radio frequency wireless messages with the mobile wireless device, to negotiate optical power delivery to the apparatus from the wireless device;

receiving, by the apparatus, optical power from the mobile wireless device at a power level associated with the optical power requirements in response to the radio frequency signal; and operating, by the apparatus, electronic components in the apparatus, using at least the optical power from the mobile wireless device.

13. An apparatus, comprising:
at least one processor;
at least one memory including computer program code;
the at least one memory and the computer program code configured to, with the at least one processor, cause the apparatus at least to:
transmit one or more radio frequency signals to a mobile wireless device, the one or more radio frequency signals indicating that the apparatus is capable of receiving optical powering and optical power requirements of the apparatus;

exchange radio frequency wireless messages with the mobile wireless device, to negotiate optical power delivery to the apparatus from the wireless device;

receive optical power from the mobile wireless device at a power level associated with the optical power requirements in response to the radio frequency signal; and operate electronic components in the apparatus, using at least the optical power from the mobile wireless device.

14. A computer program product comprising computer executable program code recorded on a computer readable non-transitory storage medium, the computer executable program code comprising:
code for transmitting, by an apparatus, one or more radio frequency signals to a mobile wireless device, the one or more radio frequency signals indicating that the apparatus is capable of receiving optical powering and optical power requirements of the apparatus;

code for exchanging, by the apparatus, radio frequency wireless messages with the mobile wireless device, to negotiate optical power delivery to the apparatus from the wireless device;

code for receiving, by the apparatus, optical power from the mobile wireless device at a power level associated with the optical power requirements in response to the radio frequency signal; and code for operating, by the apparatus, electronic components in the apparatus, using at least the optical power from the mobile wireless device.

\* \* \* \* \*